(12) United States Patent
Carter et al.

(10) Patent No.: US 7,734,051 B2
(45) Date of Patent: Jun. 8, 2010

(54) KEY DISTRIBUTION

(75) Inventors: Stephen R. Carter, Spanish Fork, UT (US); Carolyn B. McClain, Springville, UT (US)

(73) Assignee: Novell, Inc., Provo, UT (US)

( * ) Notice: Subject to any disclaimer, the term of this patent is extended or adjusted under 35 U.S.C. 154(b) by 998 days.

(21) Appl. No.: 10/999,820

(22) Filed: Nov. 30, 2004

(65) Prior Publication Data

US 2006/0115089 A1    Jun. 1, 2006

(51) Int. Cl.
*H04K 1/00* (2006.01)
*H04L 9/08* (2006.01)
*H04L 9/32* (2006.01)

(52) U.S. Cl. .................. 380/273; 380/270; 380/278; 713/168

(58) Field of Classification Search .......... 380/270, 380/273, 278; 713/168
See application file for complete search history.

(56) References Cited

U.S. PATENT DOCUMENTS

| 5,513,245 | A | 4/1996 | Mizikovsky et al. |
| 5,794,139 | A | 8/1998 | Mizikovsky et al. |
| 6,453,159 | B1 * | 9/2002 | Lewis .......................... 455/411 |
| 6,611,913 | B1 | 8/2003 | Carroll et al. |
| 6,728,529 | B2 | 4/2004 | Kuo et al. |
| 7,269,653 | B2 * | 9/2007 | Mentze et al. ............... 709/227 |
| 7,353,533 | B2 * | 4/2008 | Wright et al. ................... 726/1 |
| 2003/0084287 | A1 * | 5/2003 | Wang et al. ................. 713/168 |
| 2003/0095663 | A1 | 5/2003 | Nelson et al. |
| 2003/0219129 | A1 | 11/2003 | Whelan et al. |
| 2004/0196977 | A1 * | 10/2004 | Johnson et al. ............. 380/270 |
| 2005/0125669 | A1 * | 6/2005 | Stewart et al. .............. 713/171 |
| 2006/0193297 | A1 * | 8/2006 | Zhang et al. ................ 370/338 |

FOREIGN PATENT DOCUMENTS

EP    1337087 B1    9/2005

OTHER PUBLICATIONS

Wi-Fi Protected Access: Strong, standards-based, interoperable security for today's Wi-Fi networks © 2003 Wi-Fi Alliance. Apr. 29, 2003 Wi-Fi Protected Access White Paper http://www.wi-fi.org/files/wp_8_WPA%20Security_4-29-03.pdf.*

RSA Laboratories' Frequently Asked Questions About Today's Cryptography, Version 4.1 Copyright © 1992-2000 RSA Security Inc. All rights reserved. p. 127 What is the life cycle of a key?*

(Continued)

*Primary Examiner*—Kambiz Zand
*Assistant Examiner*—Benjamin A Kaplan
(74) *Attorney, Agent, or Firm*—Schwegman, Lundberg & Woessner, P.A.

(57) ABSTRACT

Methods and systems are provided for trusted key distribution. A key distribution or an identity service acts as an intermediary between participants to a secure network. The service provisions and manages the distribution of keys. The keys are used for encrypting communications occurring within the secure network.

7 Claims, 4 Drawing Sheets

OTHER PUBLICATIONS

Excerpt Network Intrusion Detection, Third Edition by Stephen Northcutt; Judy Novak Pub Date: Aug. 27, 2002.*
"Application No. 05108881.3 Extended European Search Report", (Aug. 21, 2007),7 pgs.
"Mobile IP Dynamic Security Association and Key Distribution", *Cisco IOS Release 12.3(4)T*, (2003),1-14.
Camtepe, Seyit A., "Combinatorial Design of Key Distribution Mechanisms for Wireless Sensor Networks", 1-18, Apr. 12, 2004.
Mishura, Arunesh, "Pro-active Key Distribution using Neighbor Graphs", 1-7, (2004).
Salgarelli, Luca, "Efficient Authentication and Key Distribution in Wireless IP Networks", 1-12, (2003).
Salgarelli, Luca, "Efficient Authentication and Key Distribution in Wireless IP Networks", *The Evolution of Wireless LANs and PANs, IEEE Wireless Communications*, (Dec. 2003),52-61.
Wacker, Arno, "A Fault-tolerant Key-Distribution Scheme for Securing Wireless Ad-hoc Networks", *Institute for Paralellel and Distributed Systems*, (2004).
Wacker, Arno, "A Key—Distribution Scheme for Wireless Home Automation Networks", *Institute for Parallel and Distributed Systems (IPVS)*, (2004).

* cited by examiner

KEY DISTRIBUTION

FIELD

The invention relates generally to network communications and more particularly to secure key distribution within networks.

BACKGROUND

Wireless communication is becoming increasingly popular in today's mobile society. A wide variety of devices are now prefabricated with hardware and software for providing wireless communication and increasingly more businesses and governments are offering these devices and wireless network access.

Yet, wireless networking also exacerbates many security and privacy issues which have been traditionally problematic for wired networks. This is so, because any nefarious entity (intruder) with a receiver and/or transmitter can "sniff" or detect a wireless network out of the air and potentially penetrate it or acquire its data. Conversely, with wired networks an intruder would have to tap or have access to the network wire in some manner in order to detect and penetrate the wired network. Wireless vulnerability may be further compounded by any entity equipped with a high-gain antenna; such that the entity may be miles away from what is considered a useful radiation sphere of the wireless network and the entity may still be capable of becoming an unwanted participant within that network.

Additionally, even when a wireless user is not concerned with privacy, the issue of network utilization should still be considered by the user when wireless communication is used. For example, an intruder may not just be stealing bandwidth from a wireless connection for purposes of accessing the Internet, but that intruder may also be accessing the Internet for illegal or illicit purposes. The intruder may be committing crimes over the stolen network connection or may be utilizing the network connection for purposes of injecting spam (unsolicited electronic mail) or acquiring adult material. Moreover, easy access to a wireless user's wireless network for purposes of stealing a network connection also places other resources of the user at risk of being hacked or being infected with viruses.

To date, wireless networking vulnerabilities have been addressed in large part through data encryption. The most popular wireless encryption technique is referred to as Wired Equivalent Privacy (WEP). The main drawbacks associated with WEP and other symmetric key encryption techniques are that mutually known keys have to be possessed by each device which is communicating wirelessly within the network. Furthermore, the mutual keys are manually provided to and manually configured within each device of the wireless network. Thus, if a key changes in one device, then that device can no longer communicate with its neighbor until its neighbor is manually configured with the changed key.

Also, the more traffic a wireless network encrypts without having changed its keys, the more likely it becomes that an intruder may be capable of breaking the key. Stated another way, the risk that wireless encryption keys may be broken increases as time elapses and as more data is processed with the stale keys. Given enough time and/or enough data, a persistent intruder can break an encryption key.

Therefore, more secure and trusted key distribution techniques are needed for networked environments.

SUMMARY

In various embodiments, an identity service manages and provisions the secure distribution of keys to participants of a secure network. The one or more keys are used to encrypt communications occurring within the secure network. In other embodiments, a network service provider that services a participant with external network access detects when that participant is about to cross a network service area boundary and pre-acquires keys which are to be used in the new network service area and provides those keys to the participant.

DETAILED DESCRIPTION

As used herein the term "participant" refers to a network enabled device (e.g., router (RT), access point (AP), range extender (RE), laptop, personal digital assistant (PDA), intelligent appliance, phone, etc.) or a network resource (e.g., service, application, system, etc.). Some participants, such as a RT, AP, or RE facilitate network connections and network services to other end-point (EP) devices or resources, such as a laptop, PDA, intelligent appliance, phone, etc. For example, a wireless RT may interface through a wired connection to an Internet Service Provider (ISP) and concurrently provide a wireless service to an EP within a predefined range or distance for purposes of interfacing the EP with the ISP. In this example, the RT and the EP are considered participants.

A number of the participants communicate with one another via a secure network. A secure network is one in which the participants implemented security protocols or other measures to ensure some level of security and/or privacy. In an embodiment, the secure network is implemented with Wired Equivalent Privacy (WEP) encryption keys. The distribution, management, and modification of these WEP keys are implemented and used in the novel manners described herein and below.

In various embodiments, a special network participant is referred to as an "identity service." The identity service has a trusted relationship with the other participants of the network and provides a novel mechanism for distributing and managing keys of the network. Examples of identity services which may be enhanced with the teachings presented herein may be found in U.S. Ser. No. 10/765,523 entitled "Techniques for Dynamically Establishing and Managing Authentication and Trust Relationships;" U.S. Ser. No. 10/767,884 entitled "Techniques for Establishing and Managing a Distributed Credential Store;" and U.S. Ser. No. 10/770,677 entitled "Techniques for Dynamically Establishing and Managing Trust Relationships;" the disclosures of which are incorporated by reference herein.

The embodiments presented herein may be implemented in a variety of processing devices, network resources, software services, and the like. In an embodiment, the techniques presented herein are at least partially implemented in wireless RT's, AP's, and/or RE's. In yet other embodiments, the techniques are partially implemented as features of an identity service, such as via enhancements to the identity services listed above.

Figure 1:
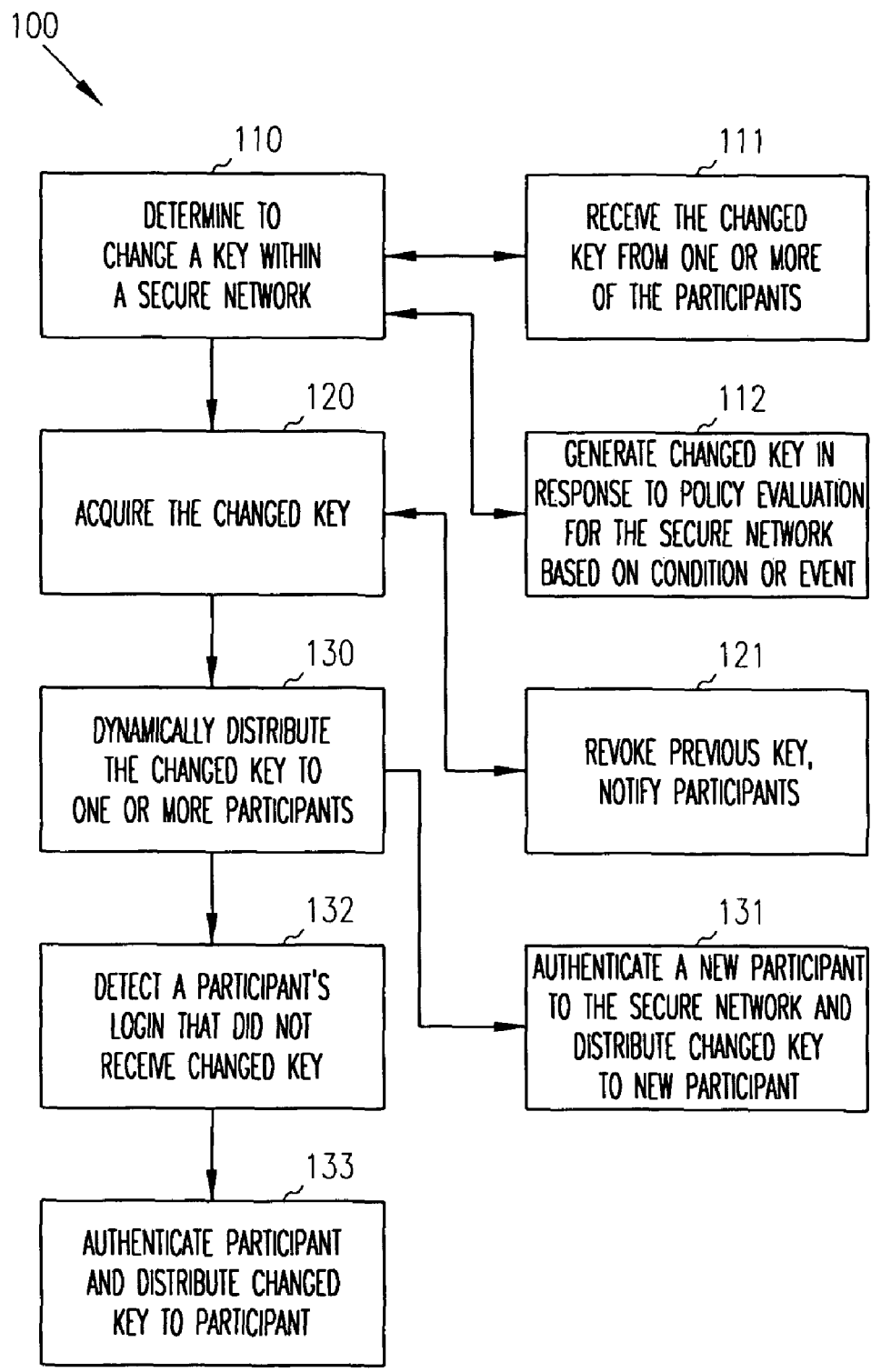
FIG. 1 is a diagram of method for distributing network keys, according to an example embodiment.

FIG. 1 is a diagram of method 100 for distributing network keys, according to an example embodiment. The method 100 (herein after "key distribution service") is implemented in a machine-accessible and readable medium and is accessible over a network. The network may be wireless, hardwired, or a combination of wireless and hardwired. In an embodiment, the network is partially wireless and partially hardwired. In still another embodiment, the key distribution service is implemented as an enhancement to an identity service. Some example identity services were presented above.

Initially, a plurality of participants establishes or desires to establish a secure network with one another. The secure network utilizes one or more keys for encrypting communications that occur within the secure network. In an embodiment, the secure network is wireless and utilizes WEP encryption keys for communication.

The key distribution service manages keys on behalf of the participants to the secure network. That is, the key distribution service may generate the keys used in the secure network, may received changed keys from one or more of the participants, may delete or revoke keys, and distributes keys as necessary to the participants. Conventionally, secure networks that have used keys for encryption have required that the keys be manually installed and configured within each participant to a secure network. The key distribution service eliminates this cumbersome requirement and provides novel features as will be described in greater detail below.

At 110, the key distribution service determines that a key used for communication within a secure network should be changed or has been changed. The ability to dynamically determine and make key changes within a secure network is a beneficial feature or aspect of the key distribution service. This is so, because if the secure network is wireless and if a key being used for WEP encryption is not periodically or regularly changed, then there is a greater potential that an intruder could break the WEP key. Consequently, keys consumed within secure networks have a certain amount of entropy which should be monitored and considered. Entropy refers to a length of time that a key's usage can still be considered safe, meaning that the chance that an intruder could break the key is minimal.

The length of time that a key is considered safe may vary based on a variety of factors that are considered by the key distribution service and which may be embodied as policies managed by the key distribution service. Some example factors include key length, the total amount of network traffic that the key has been used to encrypt within the secure network, the repetitive nature of encrypted traffic, etc. As entropy deteriorates (as evaluated by policy), consideration is given to placing a changed or new key into service within the secure network. By regularly monitoring and changing keys as entropy deteriorates, more assurance can be achieved that an intruder or external entity is not going to be practically capable of penetrating the network.

In an embodiment, at 111, the determination of a changed key is received from one or more of the participants. In other words, a network RT, AP, RE, or other network resource may change a key independent of the key distribution service. In this embodiment, the changed key is communicated by the participant that changes the key back to the key distribution service. The key distribution service can then assume responsibility for distributing the changed key to the other participants of the secure network.

In another embodiment, at 112, the key distribution service may independently decide that it should generate a changed key in response to policy evaluations for the secure network based at least in part on predefined conditions or events that are detected. For example, a policy for a key within a wireless secure network may indicate that a key should be changed after a certain amount of threshold traffic has occurred over the network or after a threshold amount of elapsed time is detected during which the key has not been modified. The policy ensures that the proper amount of key entropy is being maintained and being managed within the secure network; and the key distribution service evaluates and/or manages the policy (key entropy).

At 120, after a key change is determined to have occurred, the key distribution service acquires the changed key. In an embodiment, at 121, the key distribution service may also, in response to acquiring a changed key, revoke a previous key by sending a notification to each participant identified with the secure network. Once participants know that a key has changed, they may actively interact with the key distribution service for purposes of acquiring the new or changed key.

At 130, the key distribution service dynamically distributes the changed key to one or more of the participants. This may mean that the key distribution service actively pushes a changed key to participants that are actively logged into the secure network or actively logged into communications occurring with the key distribution service.

In an embodiment, at 131, the key distribution service may also authenticate new participants that were not previous members to the secure network after a changed key has been previously distributed to the active participants within the secure network. In these cases, trust policies and authentication policies may be used by the key distribution service for purposes of authenticating the new participant to the secure network and distributing the changed key to the new participant. Thus, participants may be dynamically added or removed from the secure network via the key distribution service. The new participants do not have to be manually configured with a key for the secure network, since the changed key can be dynamically distributed by the key distribution service, once the new participants are authenticated to the secure network via the key distribution service.

In some arrangements, a participant may not be online or in communication with the key distribution service or the secure network when a changed key is detected. Thus, at 132, such a participant may subsequently login to the key distribution service or attempt to log into the secure network. In such a situation, the key distribution service can tell by the login that the participant has not received the changed key. For example, the key distribution service may maintain a list of participants that have not received the changed key and when one of those participants logs into the key distribution service it is authenticated, at 133, and distributed the changed key.

In another situation, a participant may attempt to login into the secure network using an old or expired key through another participant, such as a wireless RT. In these cases, the wireless RT may be equipped with logic that forwards the unrecognized traffic (because it has an expired key being used to encrypt the communications) to the key distribution service along with TCP/IP header for the participant attempting to log into the secure network. In response to this, the key distribution service determines that the participant is authorized and has not received the proper changed key; it then communicates the changed key with the old key through the wireless RT. In response, the wireless RT forwards the unrecognized traffic to the participant. The participant then implements the changed key and successfully logs into and communicates with the wireless RT via the secure network.

In still other arrangements, a secure network may include a variety of RT's, where some of these RT's serve as cutover devices when a key change occurs. That is, a key change may occur and be communicated to a select number of the available RT's within a secure network by the key distribution service. The RT's not receiving the key change information serve as cutover devices to a participant that comes on line after a key change has occurred. The cutover devices are capable of communicating with participants coming on line after a key change using an old or previous key. Once the participants are connected to the key distribution service using the old key, the key distribution service distributes the changed key to them and instructs them to reconnect using the changed key to another RT that is using the changed key. Policy will drive how long the key distribution service permits cutover devices to be maintained within the secure network utilizing an old key. Once the key distribution service determines that it is appropriate to remove the old key completely from the secure network, the key distribution service dynamically distributes and configures the cutover devices with the changed key. At this point, the cutover devices are no longer available to participants that have not yet received the changed key.

In another embodiment, a number of RT's do receive the new key but do not implement the new key for their traffic until a predetermined or preconfigured amount of elapsed time or an event occurs indicating that the RT's should now use or implement the new key. During the period when the new key is not implemented, the RT's are communicating with devices that are implementing the old or prior key and during this period the RT's provision and instruct the devices to use the new key at a defined time or upon a defined event occurrence. Thus, some RT's can act as a cutover device before a new key is actually implemented.

The method 100 of FIG. 1 demonstrates a novel key management and distribution technique for secure networks that use keys for data encryption. The method 100 permits dynamic key distribution, such that participants of a secure network do not have to be manually configured with changed keys. Additionally, the method 100 permits management of key policy to ensure that proper levels of desired key entropy are being enforced within the secure network. Still further, the method 100 permits a variety of techniques for migrating new or tardy participants over to changed keys that are dynamically implemented within a secure network.

Figure 2:
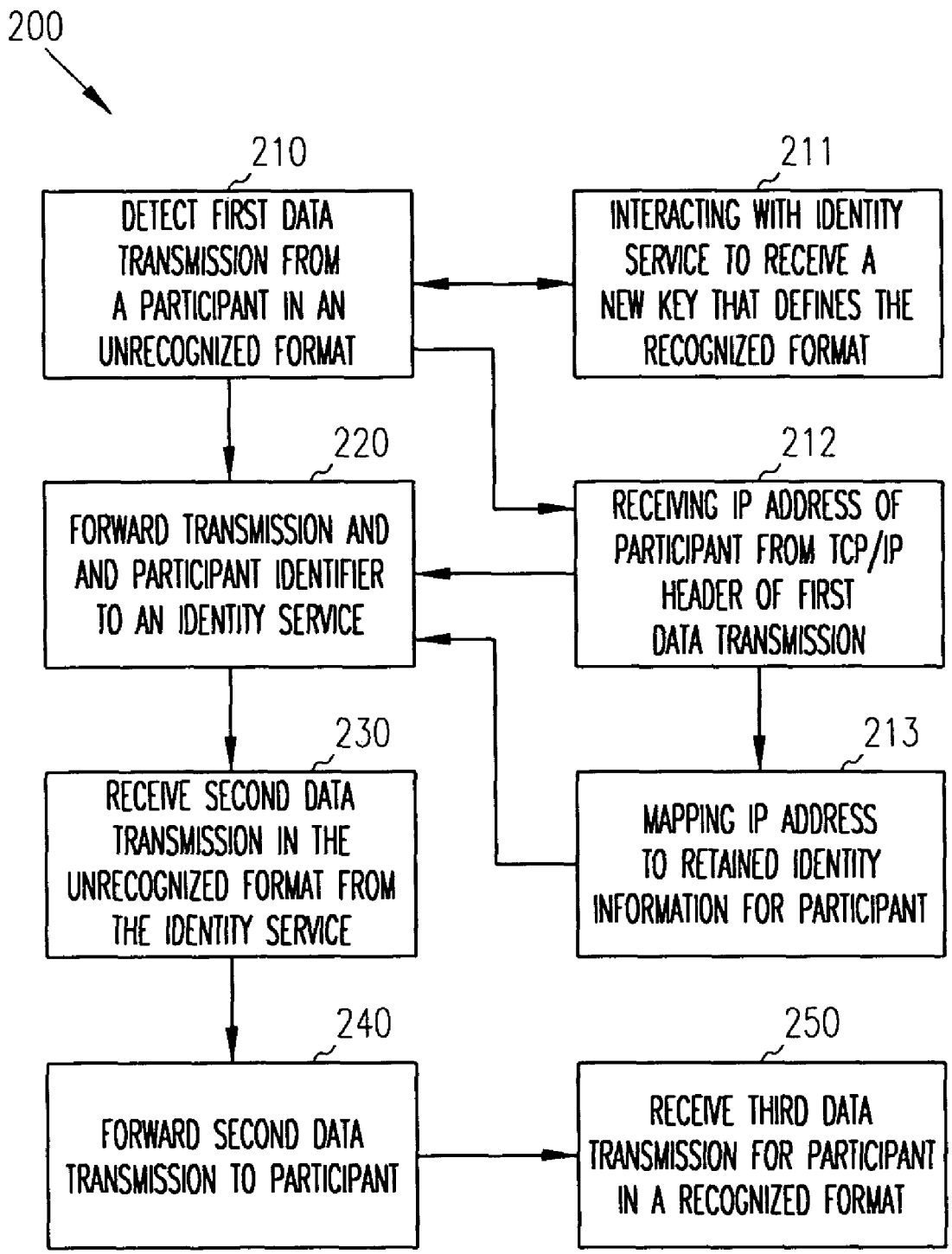
FIG. 2 is a diagram of method for servicing a network transaction, according to an example embodiment.

FIG. 2 is a flowchart of a method 200 for servicing network transactions, according to an example embodiment. The method 200 (hereinafter "router service") is implemented in a machine-accessible and readable medium and is operational over a network. In an embodiment, the router service is implemented within a RT, AP, and/or RE associated with a wireless network. The router service services participants to a secure network by providing access to another network, such as the Internet through an ISP. The router service may interact with other router services and also interacts with an identity service. In an embodiment, the identity service is the key distribution service of the method 100 presented above with the description of FIG. 1.

During normal operation, the router service services a plurality of participants identified as end-points (EP's). Again, an EP may be any processing device, such as a laptop, a PDA, a phone, an intelligent appliance, etc. The router service provides a local secure network to the EP's for accessing an external network, such as the Internet. The router service may be interfaced on one end to an ISP for purposes of accessing an external Wide Area Network (WAN) and interfaced on another end to the participants for purposes of forwarding participant traffic through the ISP and for purposes of routing returning ISP traffic to the appropriate participants. In an embodiment, the router service communicates with the participants via a wireless connection that utilizes WEP encryption. However, it is to be understood that the router service may use hardwired, wireless, or combinations of hardwired and wireless communications with its participants and its ISP. Moreover, the router service may also interface with other router services via wireless, hardwired, or wireless and hardwired connections.

At 210, the router service detects a first data transmission from a participant that is not in a recognized data format. This may occur when the router service has changed an encryption key dynamically and not informed the participant. One reason why a participant may not have been informed is that it may have been off-line or not connected to the router service when a key change occurred. Another reason a participant may not have received a key change, is that the participant may not be an authorized user of the secure network. In other words, the participant may be an intruder who is attempting to penetrate the secure network being managed by the router service. Once a key has changed, the router service may not be capable of determining if the first data transmission is legitimate (from an authorized participant) or is illegitimate (from an intruder).

The router service handles traffic within the secure local network by encrypting and decrypting traffic with one or more keys. In an embodiment, at 111, the router service acquires a new key by dynamically interacting with an identity service that defines the encryption key or keys. Thus, the first data transmission that was received, at 210, in an unrecognized format may be associated with a legitimate participant that is unaware of the key change that took place between the identity service and the router service.

At 212, the router service detects an Internet Protocol (IP) address associated with the participant that is attempting to send the first data transmission in the unrecognized format. This may be obtained from the TCP/IP header packet that accompanies the first data transmission. In another embodiment, the router service maintains identity information associated with participants that map, at 213, to the participants IP address. This identity information may be other keys, certificates, and/or signatures associated with the participant.

At 220, the router service, in response to the unrecognized data format of the first data transmission, forwards the first data transmission and an identifier to an identity service. The identifier may either be the participant's IP address, TCP/IP header information, and/or mapped identity information as was explained above at 212 and 213.

Essentially, the router service is delegating the responsibility of determining whether the participant is legitimate and whether the participant should receive a proper encryption key to the identity service. The identity service may perform operations similar to what was discussed above with the method 200 for purposes of first recognizing the first data transmission and recognizing the identity of the participant.

Interactions between the identity service and the participant will be detected by the router service as second data transmissions, which are still in the unrecognized format. The identity service will instruct the router service to forward these second data transmissions to the participant. Instructions from the identity service to the router service will occur in a format which is recognized by the router service.

Accordingly, at 230, the router service receives a second data transmission from the identity service in an unrecognized format. At 240, the second data transmission is forwarded to the participant. Assuming, that the second data transmission was a communication from the identity service to the participant that communicated the new encryption key for the recognized data format, then, at 250, the router service receives a third data transmission from the participant in a recognized format. The participant is now dynamically configured with the new key and may now be a full and active member of the secure network being serviced by the router service.

Essentially, a participant may enter a secure network in which a key has been dynamically changed unbeknownst to the participant. To achieve this in a secure manner, the router service enlists the assistance of an identity service to facilitate authenticating and dynamically configuring the participant for participation within the secure network with the new key.

Figure 3:
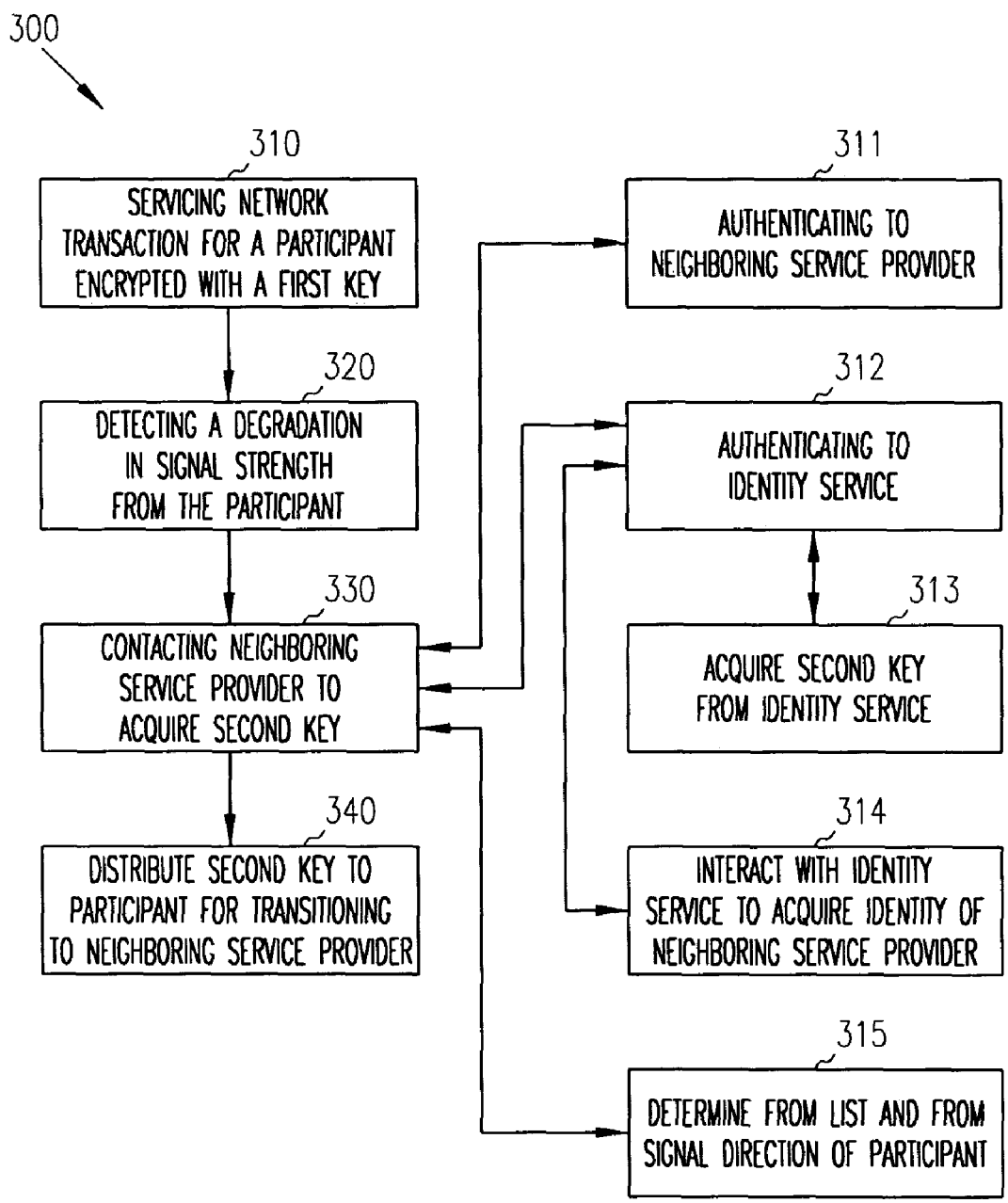
FIG. 3 is a diagram of a method for transitioning between networks, according to an example embodiment.

FIG. 3 is a flowchart of a method 300 for transitioning between network service providers, according to an example embodiment. The method 300 (herein after "transitioning service") is implemented in a machine-accessible and readable medium and is operational of a network. The network may be wireless, hardwired, or combinations of wireless and hardwired.

In an embodiment, the transitioning service is implemented as a feature within a RT, AP, and/or RE. The transitioning service facilitates moving a participant from a local homogeneous secure network to a heterogeneous secure network when it is determined that the participant is transitioning out of a service area of the transitioning service's homogeneous secure network. The term "heterogeneous" is relative with respect to the transitioning service; meaning that another foreign secure network, which is external to the transitioning service, is considered a "heterogeneous" network relative to the transitioning service's secure network, which is considered "homogeneous" with respect to the transitioning service.

At 310, the transitioning service actively services a participant over a secure network using a first key that encrypts the data transmissions in a first data format. The transitioning service services the participant by decrypting the data transmissions sent by the participant and forwarding the transmissions over an ISP connection to an external network. The transitioning service also encrypts traffic received from the ISP and forwards the encrypted traffic to the participant. The participant and the transitioning service both use the same key or sets of keys (key chains) to communicate with one another with an encrypted data format. The key or sets of keys may be distributed, managed, and changed in the manners described above with the description of the method 100 of FIG. 1 and the description of the method 200 of FIG. 2.

At 320, the transitioning service detects that a signal associated with the participant is becoming degraded below a predefined threshold. For example, suppose that the participant and the transitioning service are communicating wirelessly and the signal being received from the participant reaches a threshold level of 20% of what is considered to be optimal. A decreasing signal may be associated with a variety of circumstances, such as low power source associated with the participant's transmitter or movement associated with the participant which is placing the participant in a location that is out of the range of the transitioning service.

If the degraded signal is related to movement of the participant within the secure network's service area, then, at 330, the transitioning service dynamically contacts a neighboring service provider to acquire a second key or second chain of keys associated with the neighboring service provider's secure network. This second key is acquired before the transitioning service loses contact with the participant.

The second key may be dynamically acquired for the neighboring service provider's secure network in a variety of manners. For example, at 311, the transitioning service may be configured to directly and dynamically authenticate to the neighboring service provider for purposes of acquiring the neighboring service provider's second key.

Alternatively, the transitioning service may enlist the assistance of an identity service or key distribution service, such as the one discussed above and discussed with the method 100 of FIG. 1. To do this, the transitioning service, at 312, authenticates to the identity service. Next, assuming the transitioning service has the proper authorization; the transitioning service acquires, at 313, the second key for the neighboring service provider from the identity service.

In some embodiments, the transitioning service may interact with the identity service, at 314, for purposes of initially identifying the neighboring service provider. That is, a variety of neighboring service providers may be available to service the transitioning participant. The identities of these available neighboring service providers and their authentication mechanisms may not be preconfigured or defined within the transitioning service. Thus, the transitioning service may utilize an intermediate trusted identity service for purposes of acquiring the identities of available neighboring service providers and authenticating to one of the neighboring service providers for purposes of acquiring the second key of that neighboring service provider's current secure encryption format.

In still other arrangements, at 315, the transitioning service may have a predefined list of available neighboring service providers from which a selection can be made to service the transitioning participant. In these embodiments, the signal strength may also be associated with a direction from which the participant is transmitting its signals. That direction may be used to select the most appropriate neighboring service provider. Next, an identity service may be used or the appropriate neighboring service provider contacted directly for purposes of acquiring the second key, which is used for data encryption within the secure network of the appropriate neighboring service provider.

The transitioning service acquires the second key for the participant in advance of losing communication with the participant as the participant transitions from the homogeneous secure network of the transitioning service to a heterogeneous secure network associated with a neighboring service provider. At 340, that second key and the identity of the neighboring service provider are dynamically distributed to the participant for transitioning to the neighboring service provider's secure network.

The transitioning service provides a novel mechanism for permitting EP's to travel geographically while dynamically transitioning from one secure network to another secure network without losing service. The networks remain secure because a common identity service or key distribution service actively manages key policies for each of the networks to ensure key entropy has not degraded beyond their predefined thresholds. The identity service also serves to manage the distribution of keys to participants so that the participants can stay actively connected to the secure networks. The transitioning service facilitates a participant's transition from one secure network to another secure network as a participant travels beyond the boundaries of the transitioning service's secure network. It should also be noted that a participant's IP address may dynamically change as the EP moves across network boundaries.

Figure 4:
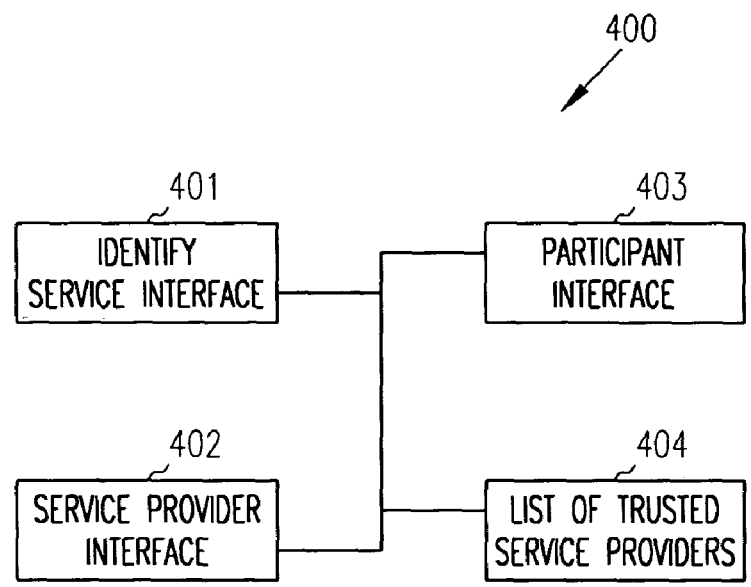
FIG. 4 is a diagram of key management system, according to an example embodiment.

FIG. 4 is a diagram of a key management system 400, according to an example embodiment. The key management system 400 is implemented in a machine-accessible and readable medium and is operational over a network. The network may be wireless, hardwired, or a combination of wireless and hardwired. In an embodiment, the key management system 400 is implemented as hardware and/or software within a RT, AP, and/or RE. The key management system 400 implements the techniques presented above with respect to the methods 200 and 300 of FIGS. 2 and 3.

The key management system 400 includes an identity service interface 401, a service provider interface 402, and a participant interface 403. In an embodiment, the key management system 400 also includes a list of trusted service providers 404.

The identity service interface 401 authenticates to and interacts with an identity service or a key distribution service, such as the key distribution service represented by the method 100 of FIG. 1. The interactions with the identity service is for purposes of acquiring new data encryption keys or communicating new data encryption keys to the identity service. The identity service interface 401 may also be used to acquire the identities of service providers associated with other disparate (heterogeneous) secure networks.

The service provider interface 402 is adapted to communicate with other RT's, AP's, and/or RE's. The service provider interface 402 is adapted to facilitate the transitioning of a participant to a neighboring service provider. The techniques for achieving this were discussed above with respect to the method 300 of FIG. 3.

The participant interface 403 is adapted to communicate with participants within a secure network being managed by the key management system 400. The participant interface 403 receives data transmissions from participants in an encrypted format defined by one or more encryption keys; decrypts the transmissions and forwards them to an external network or ISP. The participant interface 403 is also adapted to receive traffic from an external network and to encrypt that traffic for secure delivery to the participants.

The key management system 400 may uniquely utilize the identity service interface 401 and the participant interface 403 for purposes of facilitating a new data encryption key to a participant that has not received the new key. Techniques for achieving this were presented above with respect to the method 200 of FIG. 2.

The key management system 400 may also include a list of trusted service providers 404 for which the key management system 400 may securely interact with and transition participants to. In an embodiment, the list 404 may be dynamically modified by the identity service through the identity service interface 401. In this way, service providers may be dynamically added or removed from the list 404.

Figure 5:
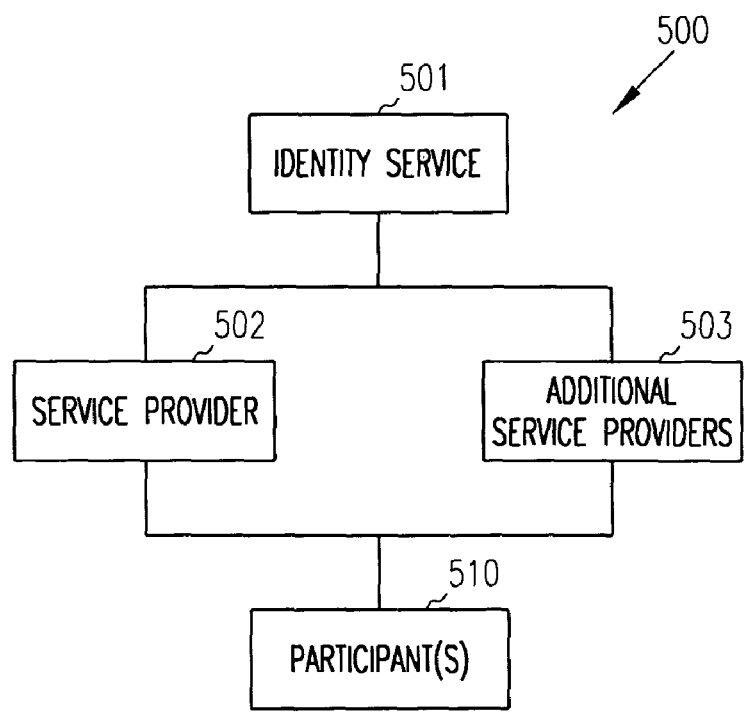
FIG. 5 is a diagram of another key distribution system, according to an example embodiment.

FIG. 5 is a diagram of another key management system 500, according to an example embodiment. The key management system 500 is implemented in a machine-accessible and readable medium and is operational over a network. The network may be hardwired, wireless, or a combination of hardwired and wireless. In an embodiment, the key management system 500 implements, among other things, the techniques presented above with respect to the methods 100, 200, and 300 of FIGS. 1-3, and the key management system 400 of FIG. 4.

The key management system 500 includes an identity service 501 and a service provider 502. In some embodiments, the key management system 500 also includes a plurality of additional service providers 503. The key management system 500 manages data encryption keys for a plurality of participants 510.

The identity service 501 maintains a trusted relationship with the service providers 502 and 503 and the participants 510. In addition, identity service 501 manages and distributes data encryption keys in the manners discussed above with respect to the method 100 of FIG. 1. The identity service 501 may also facilitate new key distribution in the manners discussed above with respect to the method 200 of FIG. 3. Additionally, the identity service 501 may facilitate the key distribution between service providers 502 and 503 in the manners discussed above with respect to the method 300 of FIG. 3.

The service provider 502 and the optional additional service providers 503 manage secure networks between participants 510 and external networks serviced through an ISP. In an embodiment, the features of the service providers 502 are implemented in hardware and software within RT's, AP's and/or RE's. These features and descriptions were provided above with respect to the methods 200 and 300 of FIGS. 2 and 3 and the key management system 400 of FIG.

An example application of the key management system 500 may be as follows. A wireless RT modified with the features of the service provider 502 services a plurality of EP's implemented as the participants 510. The RT and EP's are interfaced to an identity service 501. The identity service 501 uses predefined policies to manage key entropy and when appropriate communicates new data encryption keys to the RT and the EP's. Keys may also be changed and communicated from the RT or the EP's; in which case the identity service 501 manages further distribution of those changed keys to the remaining RT or EP's that may be unaware of the key changes. In some cases, a new EP, which does not have a proper key, may be forwarded through an RT to the identity service 501 for purposes of being dynamically configured with the new key for use with that RT. The RT may detect and transition EP's to other RT's by pre-acquiring keys necessary to facilitate that transition in advance of a need for those keys.

It is now understood how secure distribution and management of data encryption keys may be dynamically managed and configured. This makes for more flexible networks that are also more secure. The techniques are particularly useful with wireless networking; albeit the techniques are equally useful in wired networks.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

The Abstract is provided to comply with 37 C.F.R. §1.72(b) and will allow the reader to quickly ascertain the nature and gist of the technical disclosure. It is submitted with the understanding that it will not be used to interpret or limit the scope or meaning of the claims.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorpo-

The invention claimed is:

1. A method implemented in a computer-readable storage medium to execute on a device to perform the method, comprising:

determining, by an identity service, to change a key used for communicating within a secure network, a policy evaluates entropy for usage of the key in response to a length of time that the key is in service and when the length of time is exceeded, according to the policy, the key is determined to need a change, and the length of time is resolved in response to factors that include a key length for the key, a total amount of network traffic that the key was used to encrypt that traffic, and repetitiveness of some of the network traffic;

acquiring, by the identity service, the changed key;

dynamically distributing and actively pushing, by the identity service, the changed key to one or more participants within the secure network for use with communications occurring within the secure network between the one or more participants;

instructing, by the identity service, a particular participant to use the changed key after the particular participant attempts to log onto the secure network using the key, which has expired for the secure network, a login attempt is made by the particular participant to access the secure network via a wireless router;

forwarding, by the wireless router, unrecognized traffic associated with the attempted login that is encrypted with the key, the wireless router unable to determine if the unrecognized traffic is legitimate and from an authorized participant or illegitimate and from an intruder, the wireless router forwarding the unrecognized traffic to the identity service;

evaluating, by the identity service, the unrecognized traffic as being associated with an authorized participant that has not yet received the changed key;

providing, by the identity service, the changed key back through the wireless router, which the wireless router still does not recognize because communication back to the authorized participant uses encryption that is still associated with the key; and implementing by the authorized participant the changed key to successfully log into the secure network via the wireless router, which now recognizes traffic provided by the authorized participant because that traffic is encrypted with the changed key that the wireless router is configured to use.

2. The method of claim 1, wherein determining further includes receiving the changed key from one of the one or more participants that is the wireless router.

3. The method of claim 1, wherein determining further includes generating the changed key in response to a condition or an event associated with a policy for the secure network.

4. The method of claim 1 further comprising, revoking a previous key from use within the secure network by notifying the one or more participants.

5. The method of claim 1 further comprising:

authenticating a new participant for access to the secure network; and distributing the changed key to the new participant for use within the secure network with the one or more participants.

6. The method of claim 1, wherein distributing further includes:

detecting at least one of the participants as attempting to log into the secure network with a previous key;

authenticating that participant; and distributing the changed key to that participant.

7. The method of claim 1, wherein determining further includes identifying the secure network as a wireless network and the changed key as a Wired Equivalent Privacy (WEP) key.

* * * * *